United States Patent
Musso et al.

(10) Patent No.: US 10,167,714 B2
(45) Date of Patent: Jan. 1, 2019

(54) PIEZORESISTIVE CEMENT NANOCOMPOSITES

(71) Applicant: SCHLUMBERGER TECHNOLOGY CORPORATION, Sugar Land, TX (US)

(72) Inventors: Simone Musso, Cambridge, MA (US); Mickael Allouche, Clamart (FR); Matteo Pavese, Gassino Torinese (IT)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 198 days.

(21) Appl. No.: 15/036,975

(22) PCT Filed: Nov. 21, 2014

(86) PCT No.: PCT/US2014/066748
§ 371 (c)(1),
(2) Date: May 16, 2016

(87) PCT Pub. No.: WO2015/077524
PCT Pub. Date: May 28, 2015

(65) Prior Publication Data
US 2016/0258269 A1 Sep. 8, 2016

Related U.S. Application Data

(60) Provisional application No. 61/907,666, filed on Nov. 22, 2013.

(51) Int. Cl.
*E21B 47/005* (2012.01)
*E21B 47/00* (2012.01)
(Continued)

(52) U.S. Cl.
CPC ........ *E21B 47/0005* (2013.01); *C04B 14/026* (2013.01); *C04B 14/386* (2013.01);
(Continued)

(58) Field of Classification Search
CPC ........ E21B 47/00; E21B 47/005; E21B 33/14; G01B 7/18; G01L 1/18; C04B 14/386;
(Continued)

(56) References Cited

U.S. PATENT DOCUMENTS 6,431,270 B1 * 8/2002 Angle ........................ E21B 4/18
166/50
2009/0229494 A1 9/2009 Shah et al.
(Continued)

OTHER PUBLICATIONS

Azhari, Faezeh, et al., "Cement-based sensors with carbon fibers and carbon nanotubes for piezoresistive sensing", Cement & Concrete Composites (2012): 866-873.
(Continued)

*Primary Examiner* — Brad Harcourt

(57) ABSTRACT

Methods may include pumping a cement composition containing one or more conductive fillers into an annular region of a wellbore created between a casing and a surface of the wellbore, allowing the cement composition to cure, emplacing a tool for measuring at least one electromagnetic property into the wellbore, and measuring at least one of the cemented casing and the formation. In another aspect, methods may include preparing a cement composition containing one or more conductive fillers, allowing the cement composition to set, and measuring at least one electromagnetic property of the set cement. In yet another aspect, cement compositions may contain a cement, one or more conductive fillers, and a surfactant, wherein the resistivity of the cement composition is less than 10 $\Omega$*m.

17 Claims, 14 Drawing Sheets

(51) Int. Cl.
| | |
|---|---|
| C04B 28/02 | (2006.01) |
| C04B 14/02 | (2006.01) |
| C09K 8/467 | (2006.01) |
| C04B 14/38 | (2006.01) |
| E21B 33/14 | (2006.01) |
| G01B 7/16 | (2006.01) |
| G01L 1/18 | (2006.01) |
| C04B 111/00 | (2006.01) |
| C04B 111/94 | (2006.01) |

(52) U.S. Cl.
CPC .............. *C04B 28/02* (2013.01); *C09K 8/467* (2013.01); *E21B 33/14* (2013.01); *G01B 7/18* (2013.01); *G01L 1/18* (2013.01); *C04B 2111/00724* (2013.01); *C04B 2111/94* (2013.01); *C09K 2208/08* (2013.01); *C09K 2208/10* (2013.01)

(58) Field of Classification Search
CPC ............... C04B 28/02; C04B 14/026; C04B 2111/00724; C04B 2111/94; C09K 8/467; C09K 2208/08; C09K 2208/10
See application file for complete search history.

(56) References Cited

U.S. PATENT DOCUMENTS

| | | | |
|---|---|---|---|
| 2011/0192594 A1 | 8/2011 | Roddy et al. | |
| 2011/0254553 A1* | 10/2011 | van Zanten | C09K 8/32 324/366 |
| 2012/0097395 A1* | 4/2012 | McClung, III | C04B 40/0209 166/285 |
| 2012/0205577 A1 | 8/2012 | Reddy et al. | |
| 2013/0213638 A1 | 8/2013 | Keller et al. | |
| 2014/0080942 A1* | 3/2014 | Brien | C04B 28/02 524/2 |

OTHER PUBLICATIONS

Kim, H K, et al. "Enhance effect of carbon nanotube on mechanical and electrical properties of cement composites by incorporartion of silica fume." n.d.

Lee, Chun-Yao, et al., "Application of Four-electrode Method to Analysis Resistance Characteristics of Conductive Concrete." International Journal of Environmental and Earth Sciences (2010): 11-15.

Musso, Simone, et al. "Influence of carbon nanotubes structure on the mechanical behavior of cement composites" Composites Science and Technology (2009): 1985-1990.

Polder, Rob B., "Test methods for on site measurement of resistivity of concrete a RILEM TC-154 technical recommendation" Construction and Building Materials (2001): 125-131.

Rivera, Evangeline, et al. "Civionics Specifications for Fiber Optic Sensors for Structural Health Monitoring," The Arabian Journal for Science and Engineering (2006): 241-248.

Yu, Xun, et al., "A carbon nanotube/cement composite with piezoresistive properties," Smart Materials and Structures (2009): 1-6.

International Search Report and Written Opinion for corresponding PCT Application Serial No. PCT/US2014/066748, dated Feb. 27, 2015, 13 pages.

* cited by examiner

PIEZORESISTIVE CEMENT NANOCOMPOSITES

CROSS REFERENCE TO RELATED APPLICATIONS

This application claims priority to U.S. Provisional Patent Application No. 61/907,666, filed Nov. 22, 2013, the entire disclosure of which is hereby expressly incorporated by reference herein.

BACKGROUND

Cements and cement composites are useful as structural materials for a variety of applications where settable materials with high compressive strength are desired. In some instances, a number of additives may be combined with cement that change various properties such as increasing flexural and tensile strength, modifying the setting time, or changing the rheological properties of a cement slurry prior to application.

In oilfield applications, cementing operations are often conducted after drilling of a wellbore has been completed. During completions operations, for example, a wellbore may be cased with a number of lengths of pipe prior to injection of a cement slurry. After placement of casing, the casing may be secured to the surrounding earth formations during primary cementing operations by pumping a cement slurry into an annulus between the casing and the surrounding formations that then hardens to retain the casing in position. The cement composition may then be allowed to solidify in the annular space, thereby forming a sheath of cement that prevents the migration of fluid between zones or formations previously penetrated by the wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect methods discussed herein are directed to methods that include pumping a cement composition containing one or more conductive fillers into an annular region of a wellbore created between a casing and a surface of the wellbore, allowing the cement composition to cure, emplacing a tool for measuring at least one electromagnetic property into the wellbore, and measuring at least one of the cemented casing and the formation.

In another aspect, methods discussed herein are directed to preparing a cement composition containing one or more conductive fillers, allowing the cement composition to set, and measuring at least one electromagnetic property of the set cement.

In yet another aspect, compositions described herein are directed to cement compositions containing: a cement, one or more conductive fillers, and a surfactant, wherein the resistivity of the cement composition is less than 10 Ω*m.

Other aspects and advantages of the invention will be apparent from the following description and the appended claims.

BRIEF DESCRIPTION OF DRAWINGS

The subject disclosure is further described in the detailed description which follows, in reference to the drawings by way of non-limiting examples of the subject disclosure.

DETAILED DESCRIPTION

Figure 1:
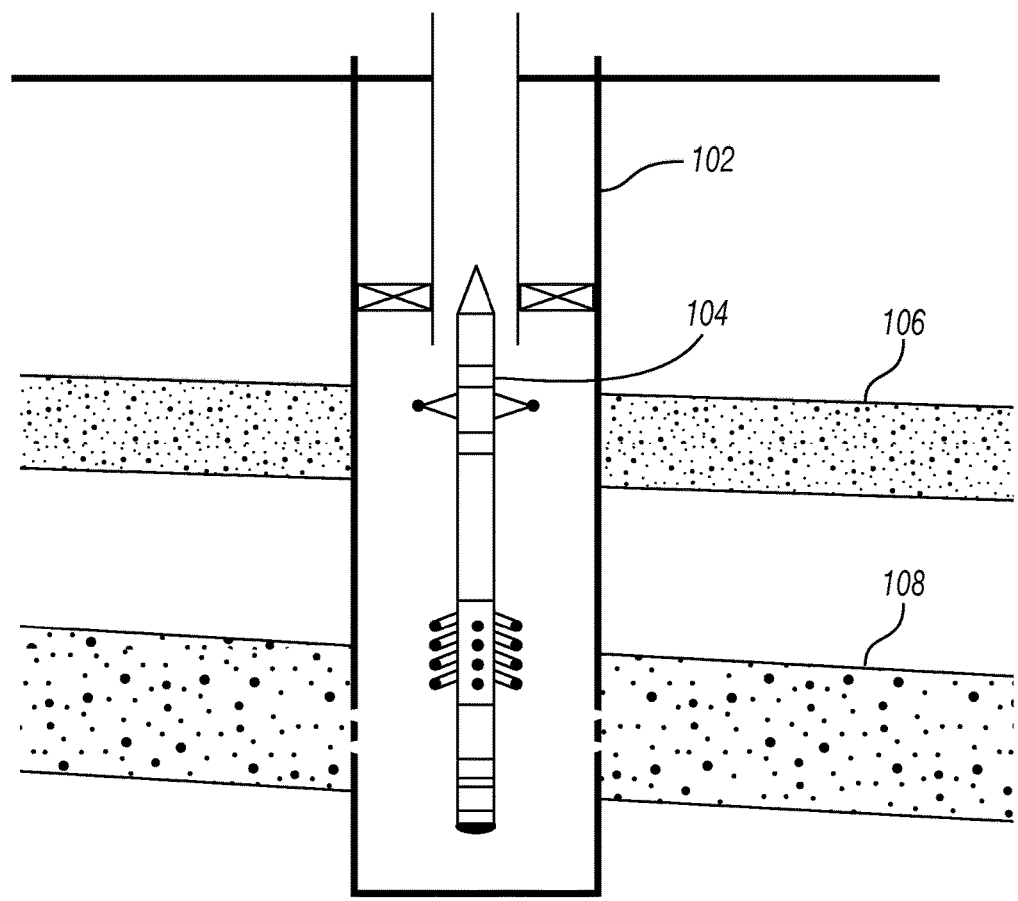
FIG. 1 depicts the use of a wellbore tool to measure resistivity of a cased wellbore in accordance with embodiments of the present disclosure.

Embodiments disclosed herein are directed to methods for preparing and using cement composites. In one or more embodiments, cement composites may include conductive fillers that modify the electro-conductive properties of the surrounding cement, and may be used in some embodiments to prepare cements having piezoresistive properties. Cement compositions in accordance with the present disclosure may also find utility in applications where it is desirable that cements be conductive or permeable to electromagnetic measurements to a greater degree than standard cements.

Cement composites in accordance with the present disclosure may be used in place of or in combination with cement formulations used in cementing applications in or outside of a wellbore. In one or more embodiments, cement composites in accordance with embodiments disclosed herein may contain conductive fillers that include micro- and nano-scale materials capable of altering the observed resistivity and/or conductivity of the cementious component.

When used in primary cementing operations, for example, at least a portion of the annular space between a casing and a formation wall may be filled with a cement composition, after which time the cement may then be allowed to solidify (often described interchangeably as curing or setting) in the annular space, thereby forming an annular sheath of cured cement. However, because cement is an insulator, electromagnetic measurement through cemented casings may be of limited utility. When using wellbore tools to evaluate possible reservoirs, for example, the range (horizontal depth) of formation that can be investigated is seriously affected by the intrinsic electrical resistivity of the cement used to fill the annulus between the casing and the rock formation.

When used in wellbore applications, cement compositions in accordance with the present disclosure may exhibit increased conductivity, which may allow increased penetration of wellbore measurements through the cement casing and into the surrounding formation. For example, wireline logging techniques that measure the relative resistivity of the formation, which may be limited by the insulative properties of cement, may be used to measure the resistivity and determine geological properties of the formation behind the well casing.

In one or more embodiments, wellbore tools may include cased hole formation resistivity (CHFR) tools that are used to record deep-reading resistivity measurements of the formation in a cased section of a wellbore. Resistivity measurements taken in accordance with the present disclosure may be used to evaluate reservoirs with low porosity and formation salinity, and CHFR tools may be used to discover producing zones in wells, to identify gas zones, or unswept reserves. In general, the effective range of CHFR measurements is decreased when the cement is more resistive than the formation.

In one or more embodiments, cement composites may be used in piezoresistive sensing measurements such as stress and/or strain monitoring. For example, the application of compressive or flexural stresses to cement compositions in accordance with embodiments disclosed herein results in a reversible increase in observed resistivity for the cement composition. When the applied stress is relieved the resistivity returns to some baseline value. In this way, by monitoring the resistivity of the cement composition, an operator may gather information about the stress environment of the cement composition on the basis of the change in resistivity of the composition.

Cement compositions in accordance with the present disclosure may be used as piezoresistive sensors embedded in larger bodies of cement in some embodiments. These sensors may provide in-situ real time mechanical stress evaluation which can help prevent and solve cement job failure. In some embodiments, cement compositions in accordance with the present disclosure may be used for surveillance and control of a cemented casing. In some embodiments, the concentration of the conductive filler may also be used to tune the mechanical properties, such as compressive strength of a cement composition.

In one or more embodiments, cement compositions in accordance with the present disclosure may be prepared by mixing a conductive filler directly with a cement slurry, placing the cement in a matter suited to the desired application, and allowing the cement to cure. Cement compositions in accordance with the present disclosure may be manufactured by dispersing a conductive filler into a base fluid such as an aqueous or non-aqueous fluid, using one or more surfactants in some embodiments, or by dispersing a conductive filler and a surfactant simultaneously into a cement in other embodiments. Dispersion of the conductive filler into a base fluid or a cement slurry may be aided by various mixing techniques such as circulation, vortex, or sonication with an ultrasonic probe or ultrasonic bath, to distribute conductive fillers throughout the fluid medium.

Cements

Cement compositions in accordance with the present disclosure include hydraulic cements that cure or harden when exposed to aqueous conditions. In one or more embodiments, cement compositions disclosed herein may include a cement component that reacts with a downhole water source and hardens to form a barrier that prevents the flow of gases or liquids within a wellbore. In some embodiments, the cement composition may be selected from hydraulic cements known in the art, such as those containing compounds of calcium, aluminum, silicon, oxygen and/or sulfur, which set and harden by reaction with water. These include "Portland cements," such as normal Portland or rapid-hardening Portland cement, sulfate-resisting cement, and other modified Portland cements; high-alumina cements, high-alumina calcium-aluminate cements, Sorel cements such as those prepared from combinations of magnesia (MgO) and magnesium chloride ($MgCl_2$); and the same cements further containing small quantities of accelerators or retarders or air-entraining agents.

In one or more embodiments, cement compositions may include light-weight high temperature cements, such as Class G or H cements. Other cements that may be used in accordance with embodiments disclosed herein include phosphate cements and Portland cements containing secondary constituents such as fly ash, pozzolan, and the like. Other water-sensitive cements may contain aluminosilicates and silicates that include ASTM Class C fly ash, ASTM Class F fly ash, ground blast furnace slag, calcined clays, partially calcined clays (e.g., metakaolin), silica fume containing aluminum, natural aluminosilicate, feldspars, dehydrated feldspars, alumina and silica sols, synthetic aluminosilicate glass powder, zeolite, scoria, allophone, bentonite and pumice.

In one or more embodiments, cement compositions in accordance with this disclosure may contain a cement component at a percent by weight (wt %) concentration having a lower limit equal or greater than 5 wt %, 7 wt %, 10 wt %, and 15 wt %, to an upper limit of 15 wt %, 20 wt %, 30 wt %, 50 wt %, and 60 wt %, where the wt % concentration of cement component, or combinations thereof, may range from any lower limit to any upper limit.

In one or more embodiments, the set time of the cement composition may be controlled by, for example, varying the grain size of the cement components, varying the temperature of the composition, or modifying the availability of the water from a selected water source. In other embodiments, the exothermic reaction of components included in the cement composition (e.g., magnesium oxide, calcium oxide) may be used to increase the temperature of the cement composition and thereby increase the rate of setting or hardening of the composition. Cement compositions may also include a variety of inorganic and organic aggregates, such as saw dust, wood flour, marble flour, sand, glass fibers, mineral fibers, and gravel. In some embodiments, a cement component may be used in conjunction with set retarders and viscosifiers known in the art to increase the workable set time of the cement.

Conductive Fillers

Cement compositions in accordance with the present disclosure may contain one or more conductive fillers that alter the electrical properties of cement before and/or after setting. In one or more embodiments, the mechanical properties of a resulting cured cement may vary depending on the quantities of conductive filler (or mixture of conductive fillers) added and the level of dispersion. As discussed the examples below, electrical and electro-mechanical tests show that the presence of conductive fillers in quantities as little as 0.1% by weight of cement may decrease the electrical resistivity of the cement composition. Further, electrical resistivity measurements may be influenced by several factors, such as the carbonation level of the cement or the environmental conditions such as the presence or absence of aqueous fluids.

Conductive fillers in accordance with the present disclosure may have utility as cement additives that reinforce a cement, in addition to creating a cement matrix that is useful as a sensor for detecting strain applied to the cement. For example, when a cement containing a conductive filler such as a conductive carbon material undergoes deformation due to applied stress, the conductive pathways between the conductive filler may increase or decrease based on the spatial change between neighboring conductive particles. These changes in the position may correspond to changes in net electrical resistivity (during a compression strain, for example, they get closer), with a consequent change of electrical resistivity.

In one or more embodiments, the conductive filler may be a micro- or nano-scale carbon-based material. In some embodiments, carbon-based materials may be formed from the carbon allotrope graphene, a planar array of $sp^2$ bonded carbon atoms that form an interconnected network of five-, six- and seven-membered rings. Conductive fillers in accordance with the present disclosure may include high aspect ratio graphene cylinders, often referred to as carbon nanotubes. Carbon nanotubes may be classified as single- and multi-walled. Single-walled nanotubes (SWNT) are composed of a single graphitic cylinder where the diameter may vary from 0.7 to 2 nm in some embodiments, while the length may range from 50 nm to several centimeters in others. Multiwall nanotubes (MWNTs) are composed of several concentric graphitic layers, where a diameter may vary from 10 to 200 nm with lengths from 1 micron to several centimeters. While a number of size ranges have been included for illustrative purposes, this is not intended to limit the disclosure, as other preparations of carbon nanotubes may be used. The electrical conductivity of carbon nanotubes is similar to that measured for graphite sheets. This conductivity is considered to be high compared to other materials and is on the order of $10^6$ to $10^7$ S/m.

In some embodiments, other carbon nanomaterials may include any member of the family of fullerenes, buckypaper, nanofiber, nanoplatelets, nano-onions, nanohorns, and functionalized derivatives thereof. In one or more embodiments, the conductive filler may be carbon-based filler such as micro- or nano-scale carbon black, conductive carbon, carbon fibers, carbon nanofibers, graphene, graphene oxide, graphene nanoplates, and the like. In one or more embodiments, commercially available conductive fillers may include carbon nanotubes such as NANOCYL™ NC7000. These are multi-walled carbon nanotubes and in some instances they may have defects on their surface which can provide spots for bonding with the cement matrix.

In one or more embodiments, carbon-based conductive fillers described above may be functionalized with various functional groups that may increase the compatibility of the conductive filler with a base fluid and/or cement composition. While not bound by any particular theory, it is envisioned that exposure of the aromatic carbons present in the carbon-based conductive fillers results in oxidation, producing varying number of polar groups on the carbon nanotube surface such as carboxylic acids or other oxygen-containing groups. Oxidative conditions include exposure to acids and acid combinations selected from nitric acid, sulfuric acid, and hydrogen peroxide.

In one or more embodiments conductive fillers may also include particulate metals additives such as micro- or nano-scale metal powders, where metals may be selected from individual metals or alloys of, for example, nickel, iron, cobalt, palladium, zinc, platinum, and the like.

In one or more embodiments, the conductive fillers described above may be selected from a wide range of sizes, molecular weights, and suppliers. In some embodiments, conductive fillers may possess a length (or diameter for spherical or approximately spherical particles) having a lower limit equal to or greater than 10 nm, 100 nm, 500 nm, 1 µm, 5 µm, 10 µm, 100 µm, 500 µm, and 1 mm, to an upper limit of 10 µm, 50 µm, 100 µm, 500 µm, 800 µm, 1 mm, and 10 mm, where the length (or diameter for spherical or approximately spherical particles) of the conductive filler may range from any lower limit to any upper limit.

In one or more embodiments, amount of conductive filler is added in proportion to the electrical percolation threshold of the cement composite. In some embodiments, conductive filler materials may be included in a cement composition at a percent by weight concentration ranging from about 0.001% by weight of cement to about 10% by weight of cement. In some embodiments, one or more conductive fillers may be added at a 0.1% by weight of cement. In other embodiments, conductive filler materials may be incorporated at 3% by weight of cement or less or at 1% by weight of cement or less. In some embodiments, when two or more conductive filler materials are mixed into cement composition, electrical conductivity may change to a greater degree that that obtained at concentrations lower than relative concentrations of the individual conductive filler materials added alone.

Cement compositions in accordance with the present disclosure may contain a concentration of one or more conductive fillers such that observed resistivity of the cement composition before and/or after setting is less than 10 Ω*m in some embodiments, and less than 1 Ω*m in other embodiments.

Surfactants

Cement compositions in accordance with the instant disclosure may include one or more surfactants that aid dispersion of a conductive filler throughout an aqueous base fluid or a cement slurry. In one or more embodiments, surfactants may be mixed with the conductive filler and dispersed prior to addition to cement compositions or added to the cement composition simultaneously. Dispersion of conductive fillers may be accomplished in some embodiments by a number of methods including, for example, stirring, sonicating, or combinations thereof, where dispersion of the conductive filler may be conducted prior to or immediately following mixing the conductive filler with the cement component.

In one or more embodiments, surfactants may be used to increase oil or water solubility, reduce aggregate formation, and/or modify the dispersability of conductive fillers into a cement composition. Surfactants that increase the compatibility of conductive fillers with aqueous fluids include sodium dodecyl sulfate (SDS), sodium dodecyl benzene sulfonate (SDBS), polynaphthalene sulfonate, polyethylene glycol p-(1,1,3,3-tetramethylbutyl)-phenyl ether, sodium dodecyl benzene dodecyl trimethyl ammonium bromide, cetyl trimethyl ammonium bromide, sodium alkyl sulfosuccinate, polystyrene sulfonate, sodium n-lauroylsarcosinate, polyvinyl pyrrolidone, poloxamers, polyethylene oxide/polyphenylene oxide copolymers such as Pluronic™, polyethylene oxide/polybutylene oxide triblock copolymers, polysorbate detergents such as polyoxyethylene sorbitan monolaurate, polyoxyethylene sorbitan monooleate, and the like. To a more limited extent, effective dispersants of nanomaterials within organic solvents include polyisobutene succinimide, polythiophene and copolymers of thiophene and 3-hexylthiophene.

In some embodiments, one or more surfactants may be added to the wellbore fluid at a concentration in the range of 0.05% by weight of cement to 1% by weight of cement. In other embodiments, dispersants may be added to the wellbore fluid at a concentration in the range of 0.1% by weight of cement to 0.8% by weight of cement. In yet more embodiments, the dispersant concentration added to the wellbore may fall within the range of 0.3% by weight of cement to 0.7% by weight of cement.

Measurement Tools

In one or more embodiments, methods in accordance with the present disclosure may include the use of tools that measure electromagnetic properties such as resistivity, conductivity, and induction. In some embodiments, measurement tools may include wellbore tools such as resistivity logging tools, cased hole formation resistivity tools, micro-resistivity tools, electromagnetic imaging tools, and induction tools. Wellbore analysis tools may also include commercially available tools such as Schlumberger's Cased Hole Formation Resistivity (CHFR) tool, Schlumberger's USI UltraSonic Imager Tool (USIT), and/or Schlumberger's Electromagnetic Imager Tool (EMIT). One or more of these tools may be used in some embodiments to provide depth-correlated measurements that may indicate casing thickness, casing conductivity, and/or relative magnetic permeability.

During wellbore operations, one or more downhole tools may be used to generate well logs. As shown in FIG. 1, a wellbore tool 104 is lowered into a cased section of a wellbore 102. Operation of the wellbore tool may be used to detect low resistivity regions of the formation such as bypassed hydrocarbon regions behind the casing 106 and intervals containing residual oil saturation 108.

In one or more embodiments, measurements in accordance with the present disclosure include single measurements and continuous signal measurement or monitoring. In some embodiments, wireline logs may be generated by lowering a logging tool down the well on a wireline. The tool is slowly brought back to the surface and the instruments on the logging tool take measurements that characterize the formations penetrated by the well in addition to other properties of the well. For example, during logging, wireline logs may use measurements of relative resistivity of the formation to determine geological composition of the downhole formation.

Suitable wellbore tools for use in measurements in accordance with embodiments of the present disclosure include tools configured for operation in varying pressures, ranging up to 15,000 psi or greater in some embodiments. Further, wellbore tools may be designed for use in elevated downhole temperatures such as 300° F. or greater in some embodiments.

EXAMPLES

The following examples are provided to demonstrate various approaches to preparing and using cement compositions in accordance with the present disclosure.

In a first example, the dispersion of various conductive fillers was studied in order to determine their suitability for use as a cement composition additive. Initially, dispersions of a carbon nanotube conductive filler were prepared by combining an amount of carbon nanotubes and an amount of dispersant equal to five times the weight of the carbon nanotubes. Water was then added to the container, in an amount that reflected the total amount of water that would be added to the final cement slurry. Next, a Sonics VIBRACELL™, 750 W, with 40% of amplitude, sonicator was used to sonicate the container's content for fifteen minutes and an ultrasonic bath (Sonica UltrasonicCleaner, 305 W) was used to provide an additional thirty minutes of sonication.

A good level of dispersion was achieved by diluting a small amount of the dispersed nanotube solution with water in a test tube. When dispersed into a sample of water, the color remained even after a few hours and resisted deposition at the bottom of a test tube, indicating a good dispersion. For poorly dispersed nanotubes, deposition is usually observed after a few hours.

Next, an additional sample of carbon fibers was pre-dispersed in water using the substantially same technique described above. The carbon fibers used were about 6 mm long with a diameter of 5-10 µm.

For preparation of mixtures of carbon nanotubes and carbon fibers, the carbon nanotubes were first dispersed and sonicated prior to the addition of the carbon fibers to increase the stability of the resulting suspension. Specifically, an amount of carbon nanotubes is placed into a container with an amount of dispersant equal to five times the weight of the carbon nanotubes. Water was then added to the container, in an amount that reflected the total amount of water that would be added to the final cement slurry. An ultrasonic probe, e.g., Sonics VIBRACELL™, 750 W, 40% of amplitude, was used to sonicate the container's content for about ten minutes. An amount of carbon fibers was then added to the container and the ultrasonic probe is used to sonicate the container's content for a further ten minutes. An ultrasonic bath e.g. Sonica UltrasonicCleaner was used to provide about 30 minutes of sonication. The carbon fibers were not added initially as they slow down the dispersion of the carbon nanotubes, especially in the first phase, when nanotubes are still agglomerated in relatively big bundles.

Once the carbon nanotubes and/or carbon fibers have dispersed in water, cement samples were then created. The cement was added slowly to the mixture of carbon nanotubes and/or carbon fibers while continuously mixing either by hand or with a mixer. In the above examples, the adopted water/cement ratio is 0.45.

After mixing, the cement is poured into cylindrical molds having a height of 40 mm with an inner diameter of 20 mm. The inner surface of the molds was lubricated in order to facilitate the removal of the cement sample after the curing phase.

During the setting process, downhole conditions were simulated by curing the cement in an oven with a temperature of about 85° C. The molds were placed on a plastic base inside a sealed plastic box partially filled with water, the water not in direct contact with the cement to maintain the cement in an environment saturated with vapor. The samples were kept at 85° C. with 100% humidity for 24 or 72 hours.

Samples were studied after the curing phase. A change in color was observed in the cement samples depending on the content and the percentage of nanotubes or fibers, which is interpreted as evidence that dispersion of the nanotubes is sufficient. A number of mechanical tests were carried out on the samples. Compressive strength tests were carried out to understand how different quantities of carbon fibers or carbon nanotubes may influence the mechanical properties of the cement. In particular, the testing machine SINTECH® 10/D was used to load the samples at a constant rate of displacement of 1 mm/min.

In the following example, cement compositions having varying concentrations of conductive fillers were prepared using the methods outlined above. Further, some samples were formulated to contain varying levels of MgO, an additive that is often used to avoid shrinkage of cements.

Figure 2:
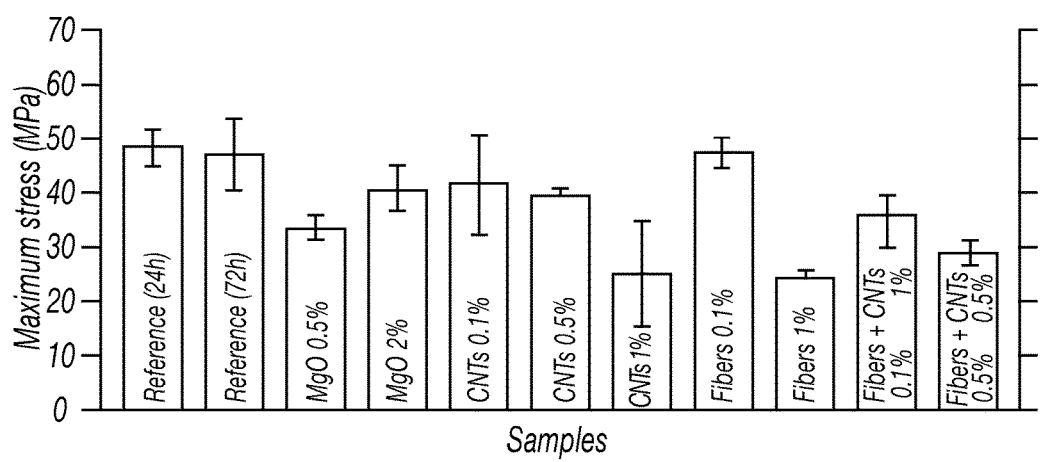
FIG. 2 depicts the compressive strength of samples containing different quantities of carbon nanotubes or carbon fibers prepared in accordance with embodiments disclosed herein.

With particular respect to FIG. 2, the compressive strength of samples containing different quantities of carbon nanotubes or carbon fibers is shown. Samples containing 0.1% of carbon nanotubes or carbon fibers exhibited maximum stress values similar to the reference cement containing no conductive fillers.

Figure 3:
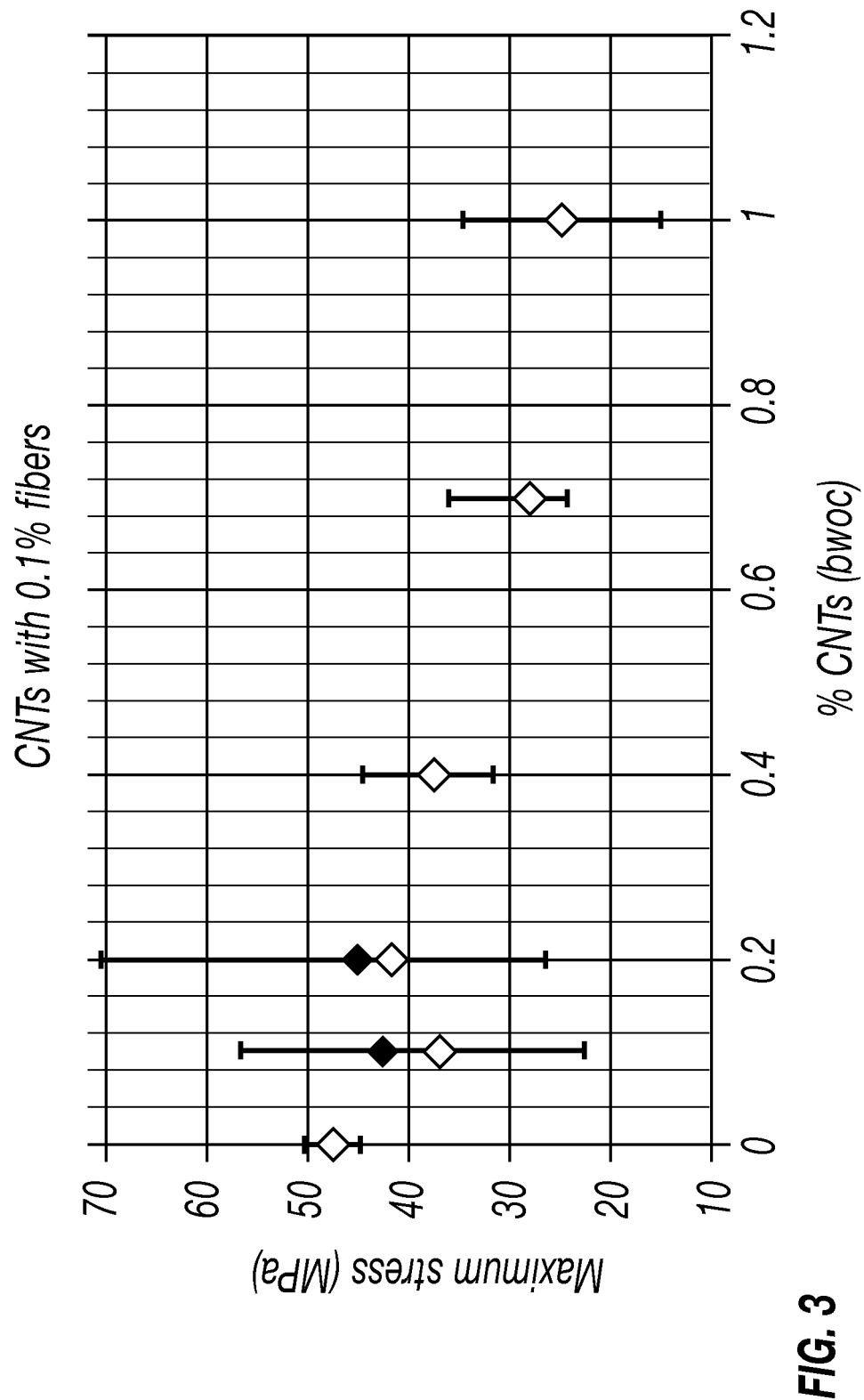
FIG. 3 shows the compressive strength of samples prepared in accordance with embodiments disclosed herein containing about 0.1% of carbon fibers and a variable quantity of carbon nanotubes.

Further experiments were carried out using samples prepared using about 0.1% of fibers and a variable amount of carbon nanotubes. In another series of experiments, the compressive strength of samples containing about 0.1% of carbon fibers and a variable quantity of carbon nanotubes were studied. With particular respect to FIG. 3, the gray points are the average compressive strength value, the two black points and associated error bars indicate the average compressive strength of samples also containing about 0.8% MgO by weight of cement.

Figure 4:
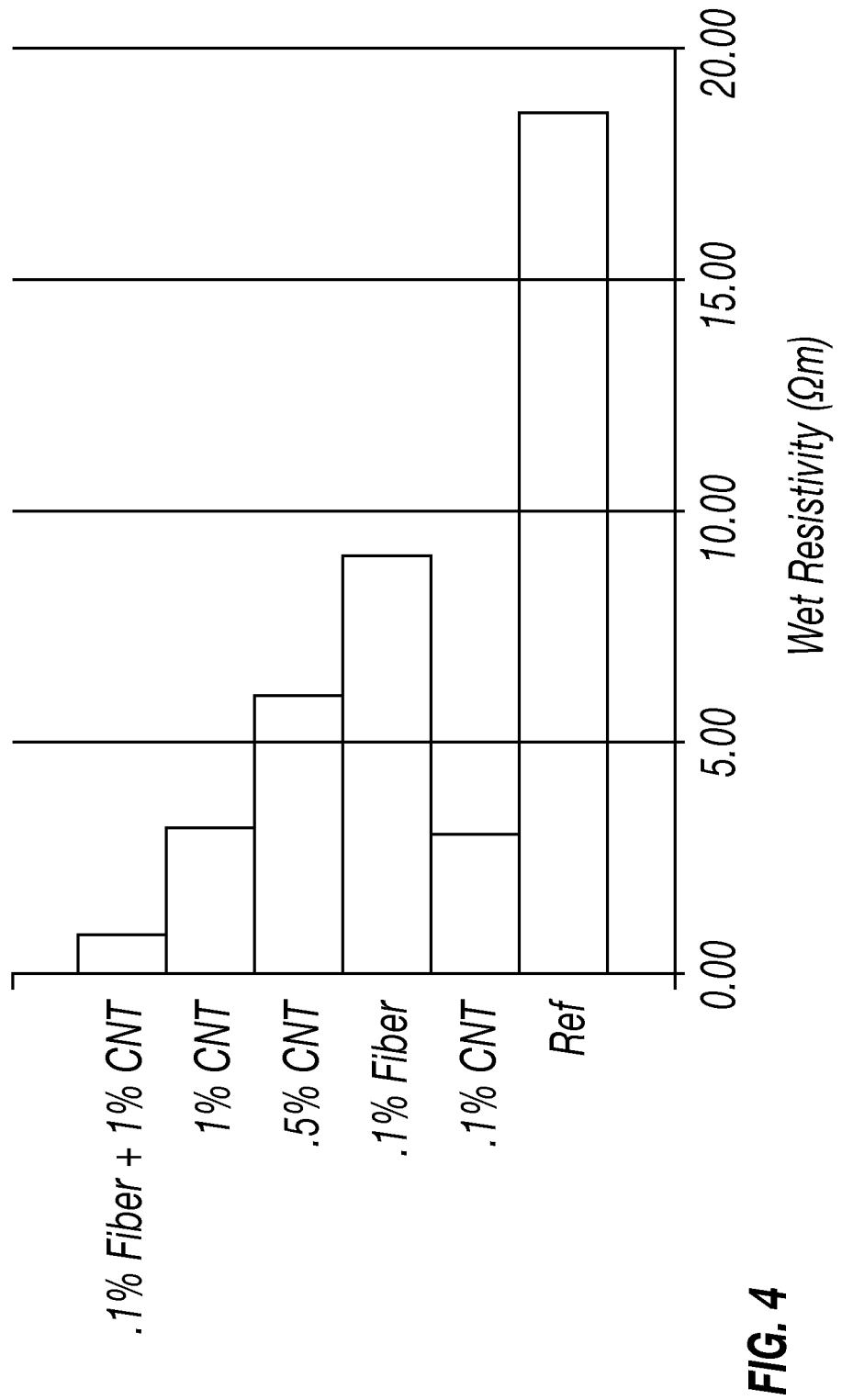
FIG. 4 depicts the electrical resistivity of samples prepared in accordance with embodiments disclosed herein containing different amounts of carbon nanotubes and/or carbon fibers.

In order to understand the effectiveness of carbon nanotubes and carbon fibers in reducing the electrical resistivity of cement a number of cement electrical resistivity tests were carried out. A Wayne Karr Component Analyzer 6400 was used to measure the resistivity of the samples. Measurements were taken with 2 probes (2 copper plates) connected to the instrument. Alternating current (AC) was used, with an AC voltage of 300 mV and 60 kHz of frequency. The right combination of voltage and frequency was obtained to minimize the phase angle. The sample with the two copper probes is kept under a pressure of about 150 N to ensure good contact, either with a clamp or with a press. The electrical resistivity of samples comprising different amounts of carbon nanotubes and/or carbon fibers is shown in FIG. 4.

While not limited by any particular theory, several parameters are believed to influence the electrical resistivity of the material. First, the amount of water contained by the sample may affect the observed resistivity of the sample. Depending on the environmental conditions in which the sample was kept e.g. temperature, humidity, time of response; the water level, and therefore the resistivity, may change. In order to minimize the effect of water on the measured resistivity values, the samples were completely dried out by placing the samples in a vacuum oven at about 40° C. for a few days. The samples were then placed in a saturated solution of water and $Ca(OH)_2$ for a few days. From these samples, values of "wet resistivity" and "dry resistivity" can be obtained which will simulate wellbore conditions where the material can be at high temperatures in a dry environment or surrounded by water.

Another parameter that may influence the electrical resistivity of the cement samples is the carbonation level. When cement is exposed to air, calcium hydroxide reacts with carbon monoxide forming calcium carbonate, which is an electrical insulator.

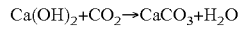

$$Ca(OH)_2 + CO_2 \rightarrow CaCO_3 + H_2O$$

Thus, one factor that affects the speed of the conversion of carbon hydroxide to carbonate is the surface area of the cement exposed to the atmosphere. As a result, the electrical resistivity of a cement sample increases with time, if the sample is exposed to air, which can decrease the reliability of measurements compared from samples prepared at different times.

Figure 5:
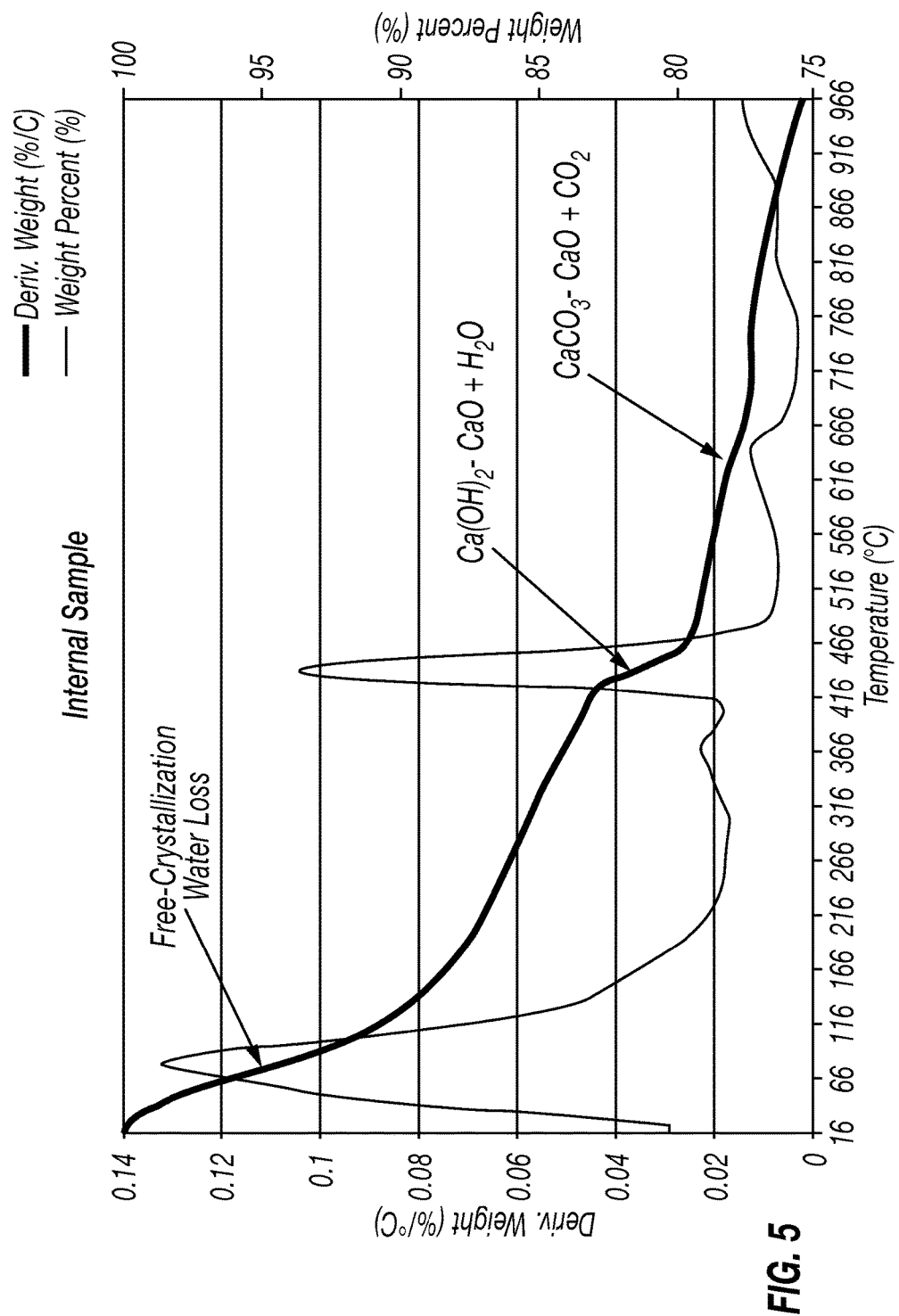
FIG. 5 depicts a TGA test run on the inner part of a sample prepared in accordance with embodiments disclosed herein.
Figure 6:
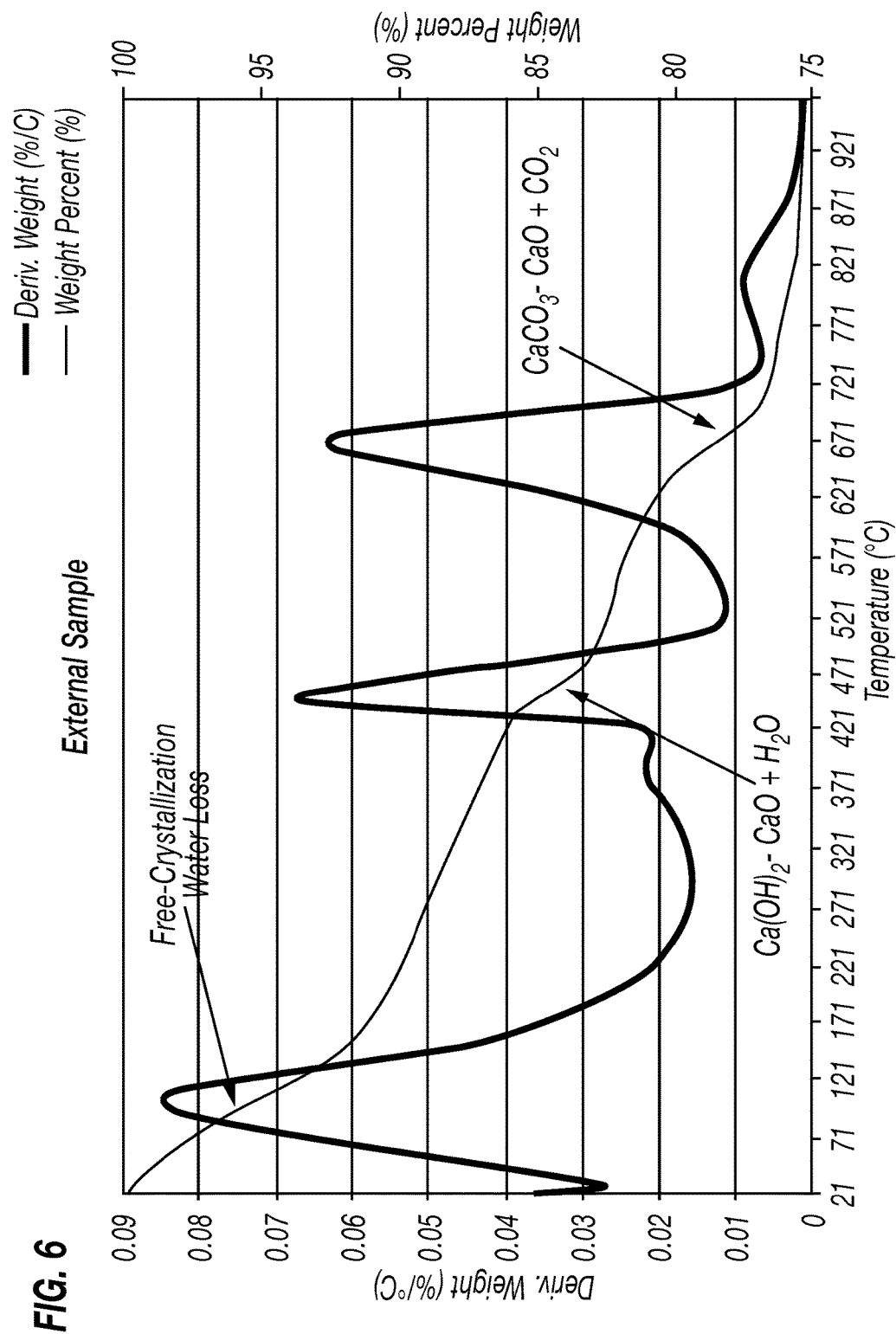
FIG. 6 depicts the TGA test run on the outer part of a sample prepared in accordance with embodiments disclosed herein.

A TGA (Thermo Gravimetric Analysis) may be used to study the effect of carbonation on the samples. The weight loss related to the decomposition of calcium carbonate (which happens at about 600-700° C.) is greater when the cement is carbonated. With particular respect to FIG. 5, a TGA test is run on the inner part of a sample, not affected by carbonation. In comparison, a TGA test run on the outer part of a sample, shown FIG. 6, exhibits a change in the level of carbonation.

Thus, for some measurements the carbonated layer of cement was removed by grinding away a thin layer of the external surface. To improve the contact between the sample and the probes, a conductive gel such as Spectra360 gel is used.

In another example, the electrochemical properties of the samples were tested under cyclic load. The same testing configuration was used as for the electrical resistivity tests discussed above, but in this case the sample and the probes were placed under an Instron press. In particular, the samples were loaded with a rate of 3 kN/min, up to about 5000N and then down to 0 again. At approximately every 1000N the Instron press was stopped for about 20 seconds and the electrical resistivity was measured. The resistivity values corresponding to 0 N load were much higher compared to other load values. This is because of the low contact level between the sample and the copper plates when the system is unloaded.

Figure 7:
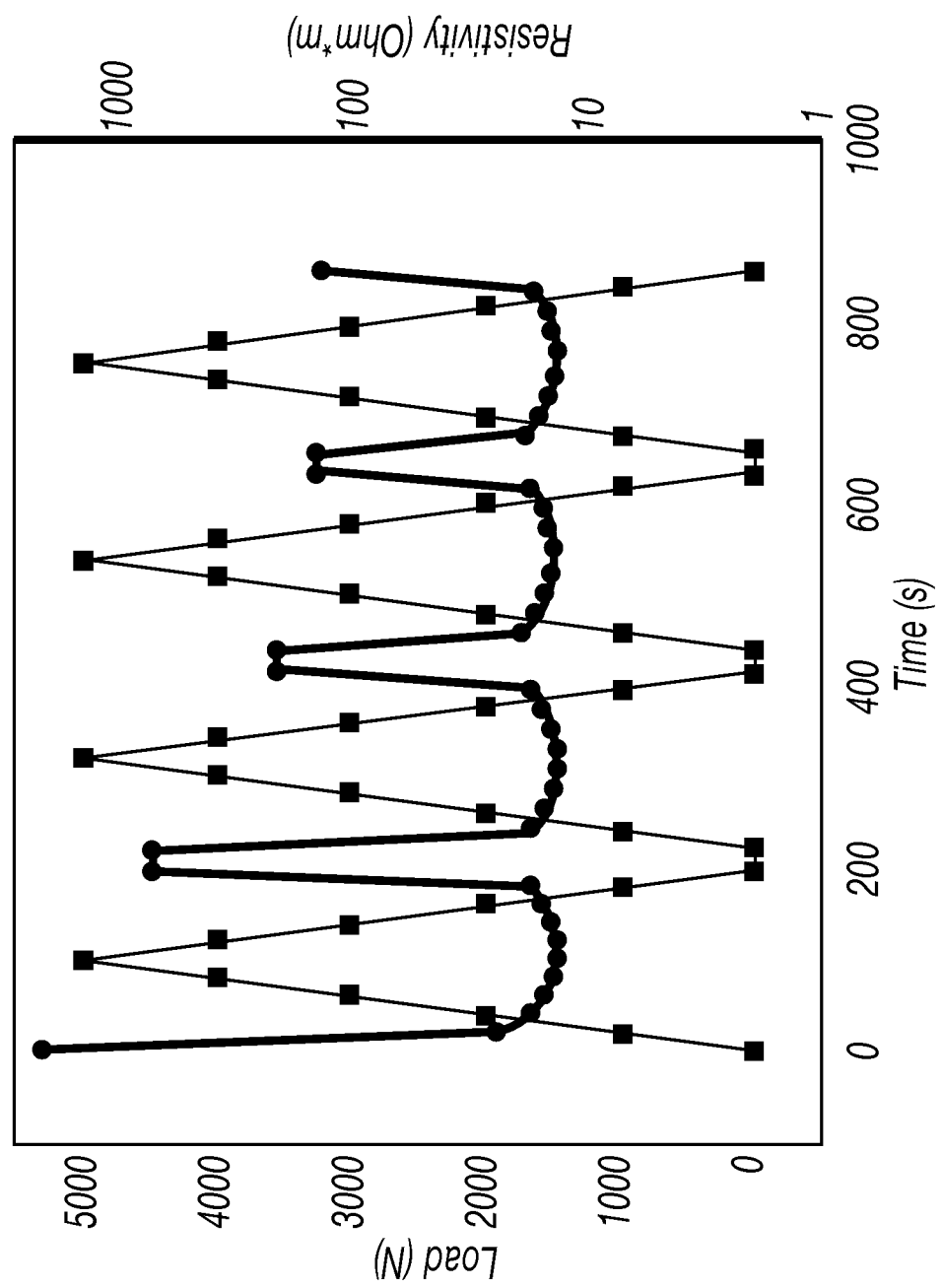
FIG. 7 depicts a graph of resistivity changing during the load cycles on samples containing 0.1% of fibers prepared in accordance with embodiments disclosed herein.

With particular respect to FIG. 7, change in resistivity during the load cycles on the samples with 0.1% of fibers is illustrated, where resistivity values are denoted by circle points and applied load is denoted using square points. The change appears higher when the load is close to 0, due to the low contact level between the sample and the measurement system. A minimum load of about 150 N should ensure that the obtained readings are not affected by the lack of contact. The measurements are pretty much stabilized after the fourth cycle. The resistivity values are reported in a logarithmic scale (base 10).

Figure 8:
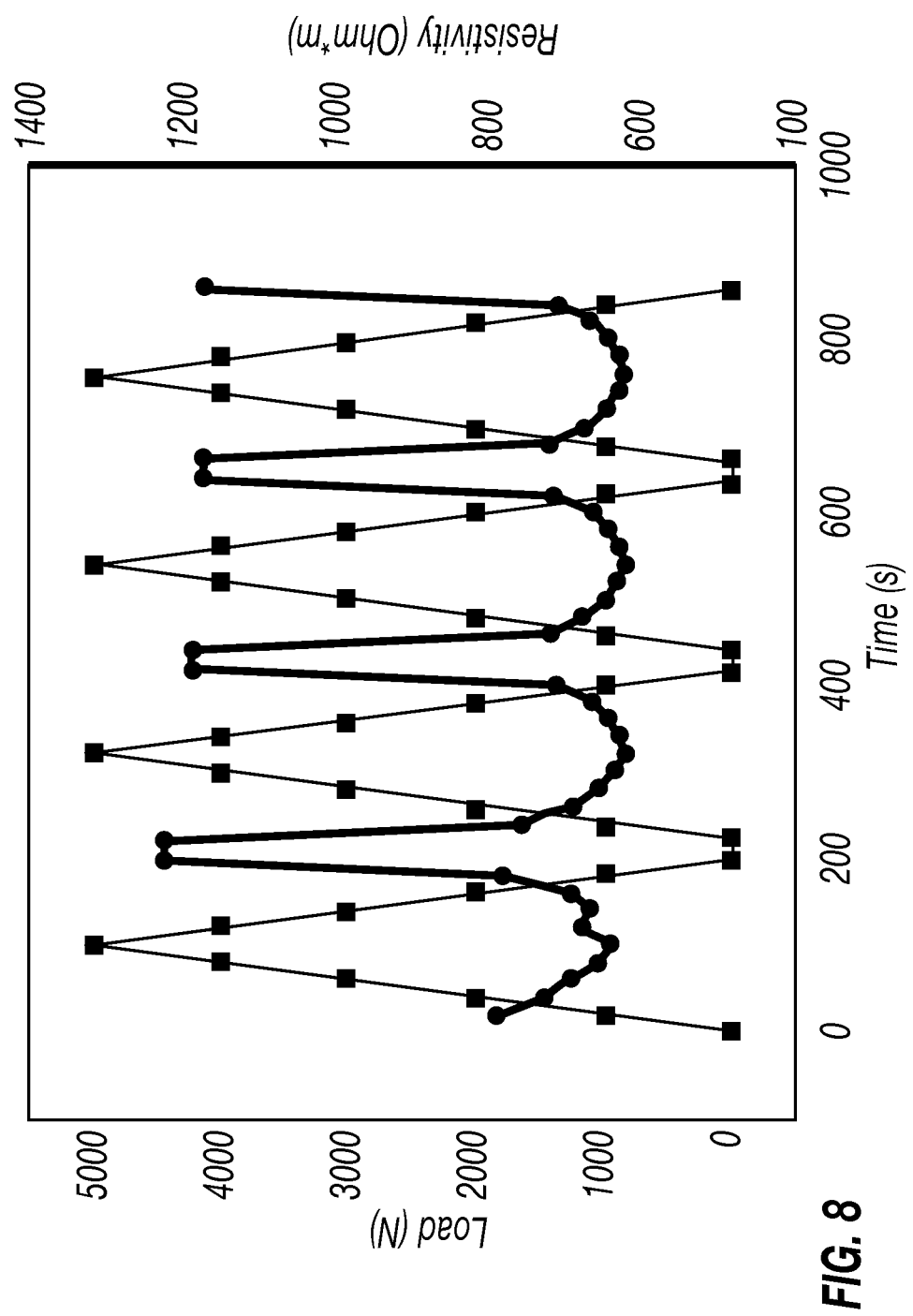
FIG. 8 depicts the resistivity change during the load cycles on samples prepared in accordance with embodiments disclosed herein containing 0.1% of carbon nanotubes.
Figure 9:
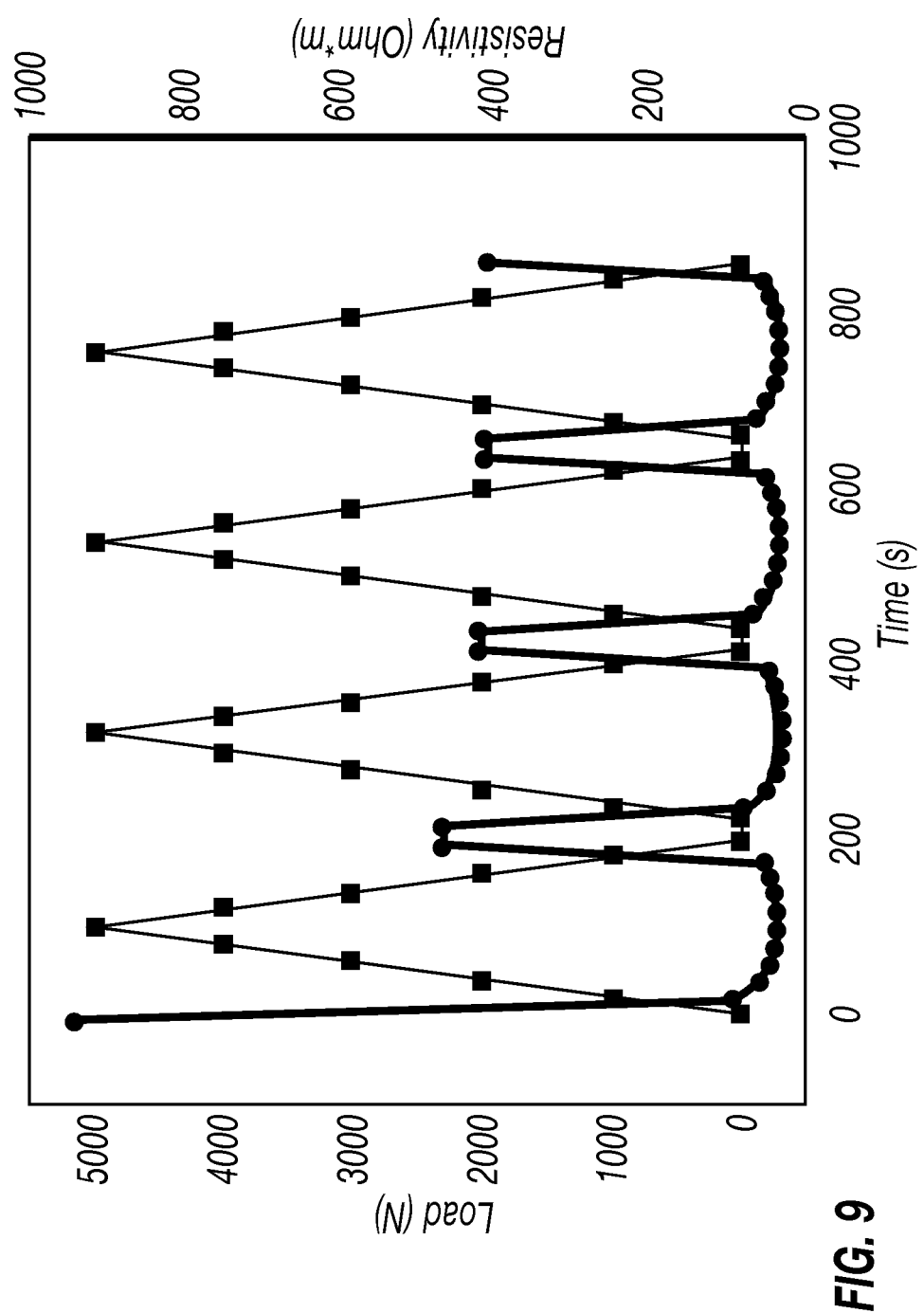
FIG. 9 depicts the resistivity changes during the load cycles on samples prepared in accordance with embodiments disclosed herein with 0.5% of carbon nanotubes.
Figure 10:
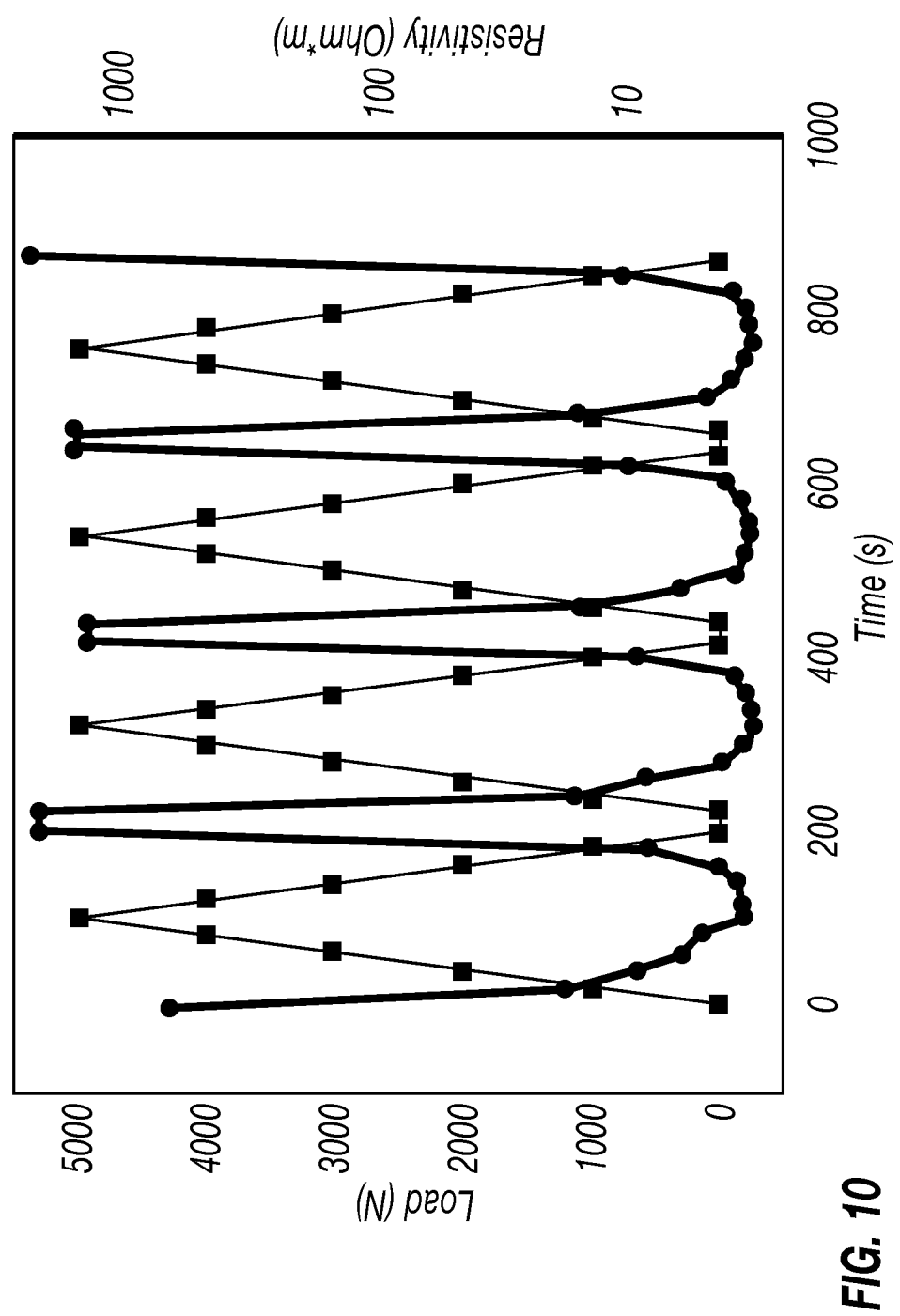
FIG. 10 depicts the resistivity changes during the load cycles on the samples prepared in accordance with embodiments disclosed herein containing 1% of carbon nanotubes and 0.1 of carbon fibers.

FIG. 8 depicts the resistivity changes during the load cycles on the samples with 0.1% by weight of cement of carbon nanotubes, where resistivity values are denoted by circle points and applied load is denoted using square points. The resistivity values are reported in a linear scale. FIG. 9 depicts the resistivity changes during the load cycles on the samples with 0.5% by weight of cement of carbon nanotubes, where resistivity values are denoted by circle points and applied load is denoted using square points. The resistivity values are reported in a linear scale. FIG. 10 depicts the resistivity changes during the load cycles on the samples with 1% by weight of cement of carbon nanotubes and 0.1% by weight of cement of fibers, where resistivity values are denoted by circle points and applied load is denoted using square points. The resistivity values are reported in a linear scale. The readings when compared to the other samples analyzed seem to be less stable even at the fourth load cycle.

The cement containing carbon nanotubes was expected to produce a piezoresistive response such that applied load increased the resistivity. Nevertheless, an opposite behavior was observed in the tested samples with the resistivity being inversely proportional to the load. This is as a result of the pores in the cement sample closing during the compression phase and the sample being "compacted" which decreases the resistivity of the sample. Further tests were run loading the samples up to higher loads.

Figure 11:
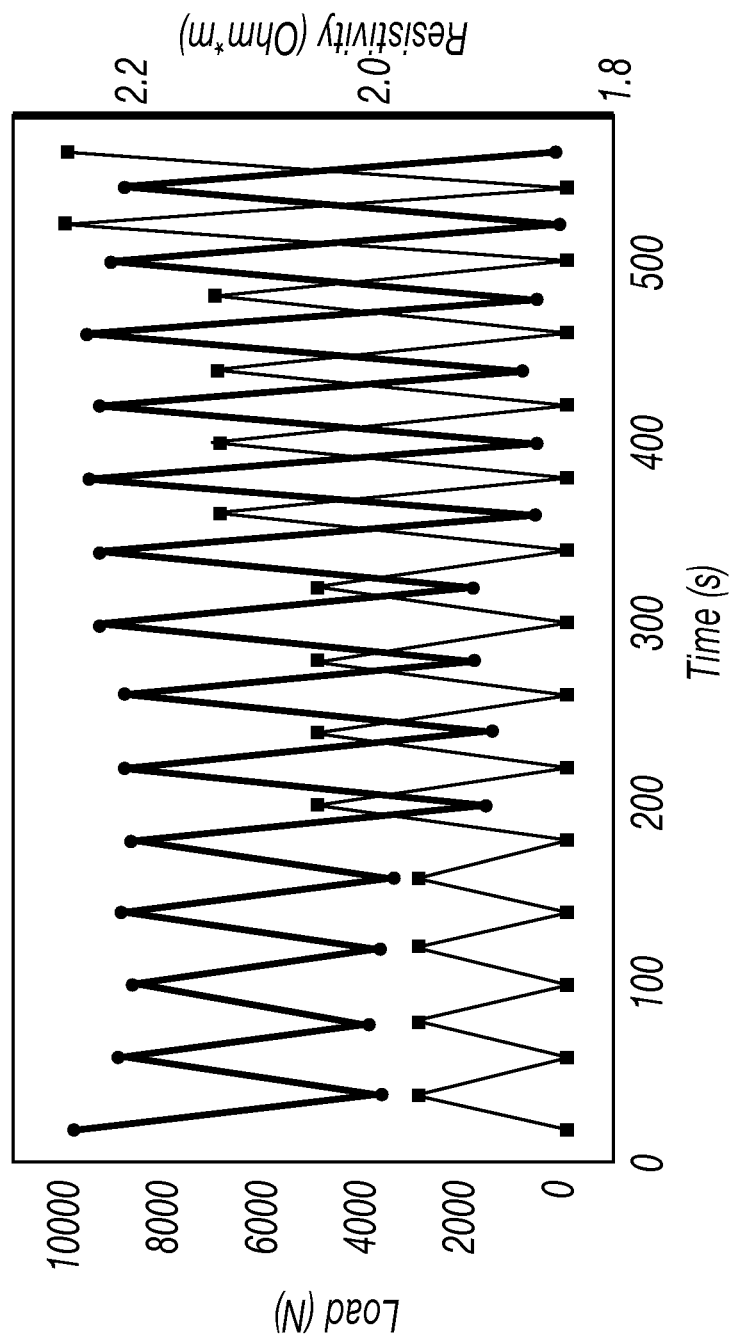
FIG. 11 depicts the resistivity changes during the load cycle on samples prepared in accordance with embodiments disclosed herein containing 0.1% of carbon nanotubes and 0.1% of carbon fibers.
Figure 12:
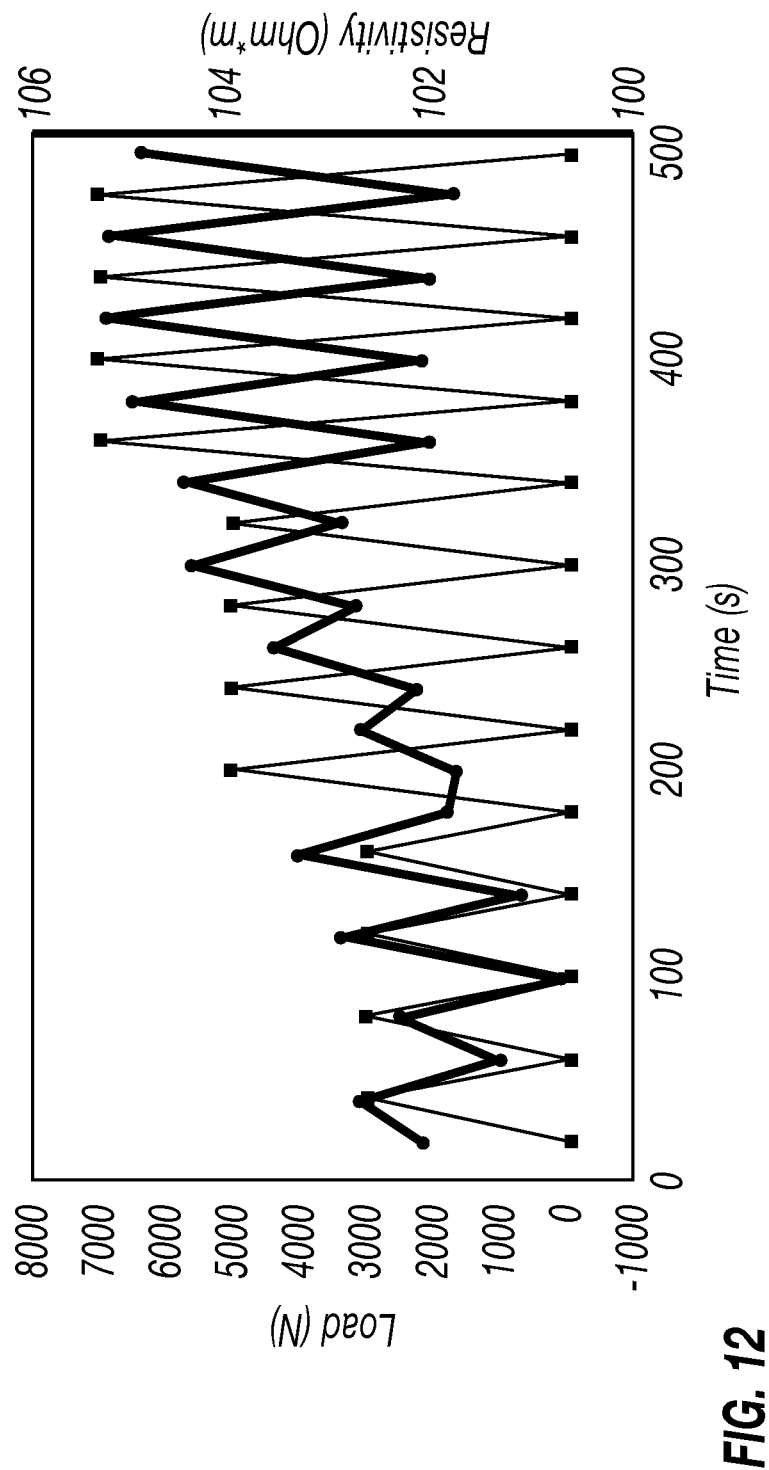
FIG. 12 depicts the resistivity changes during the load cycles on a reference sample (no nanotubes or fibers) prepared in accordance with embodiments disclosed herein.

FIG. 11 shows the resistivity change during the load cycle on the samples with 0.1% by weight of cement of carbon nanotubes and 0.1% by weight of cement of carbon fibers, where resistivity values are denoted by circle points and applied load is denoted using square points. The resistivity values are reported in a linear scale. FIG. 12 depicts the resistivity change during the load cycles on a reference sample (no nanotubes or fibers), where resistivity values are denoted by circle points and applied load is denoted using square points.

Figure 13:
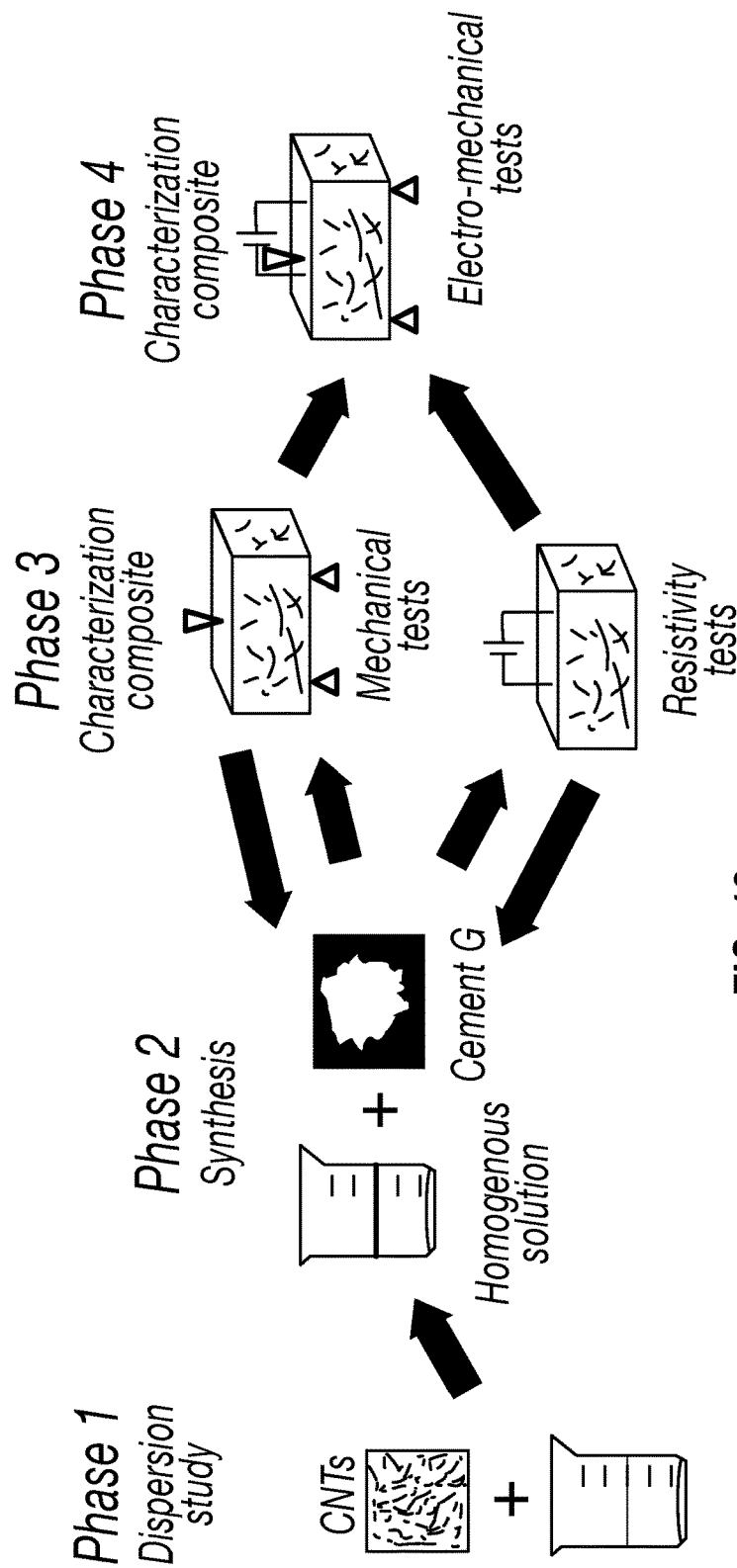
FIG. 13 depicts a method of preparing and characterizing cement composites in accordance with embodiments disclosed herein.

FIG. 13 depicts an embodiment of a general method for characterizing cement compositions in accordance with the present disclosure. In phase 1, the conductive filler or mixture of fillers is dispersed in an aqueous fluid. Depending on the degree of dispersion achieved, one or more surfactants may be desired to decrease the presence of aggregates or to increase the stability of suspension of the conductive fillers in a base fluid solution or cement slurry. In phase 2, the cement and conductive filler or conductive filler mixtures are combined using mixing techniques known in the art, including, but not limited to mechanical mixing and sonication. The resulting composite is characterized in phases 3 and 4; and is evaluated using mechanical and resistivity tests.

In another example, cement compositions were formulated with carbon nanotubes functionalized by various oxidative conditions, time periods, and temperatures. Oxidative conditions included exposure to acids and acid combinations selected from nitric acid, sulfuric acid, and hydrogen peroxide. Following functionalization, cement samples were formulated containing 0.1% of the respective conductive filler by weight of cement and resistivity of the cured cement was measured. Results are shown in Table 1 below.

TABLE 1

Oxidative formulations used in carbon nanotube functionalization. (cement samples containing 0.1% bwoc of filler).

| Sample | Time (min) | T (° C.) | Acid(s) | Resistivity ($\Omega * m$) |
|---|---|---|---|---|
| 1 | 5 | 0 | $HNO_3$ | 15 |
| 2 | 5 | 30 | 1 $HNO_3$:3$H_2SO_4$ | 11 |
| 3 | 5 | 60 | 3 $H_2SO_4$:1$H_2O_2$ | 16 |
| 4 | 30 | 0 | 1 $HNO_3$:3$H_2SO_4$ | 75 |
| 5 | 30 | 30 | 3 $H_2SO_4$:1$H_2O_2$ | 5 |
| 6 | 30 | 60 | $HNO_3$ | 27 |
| 7 | 60 | 0 | 3 $H_2SO_4$:1$H_2O_2$ | 21 |
| 8 | 60 | 30 | $HNO_3$ | 45 |
| 9 | 60 | 60 | 1 $HNO_3$:3$H_2SO_4$ | 145 |
| Unfunctionalized | — | — | — | 35 |

Figure 14:
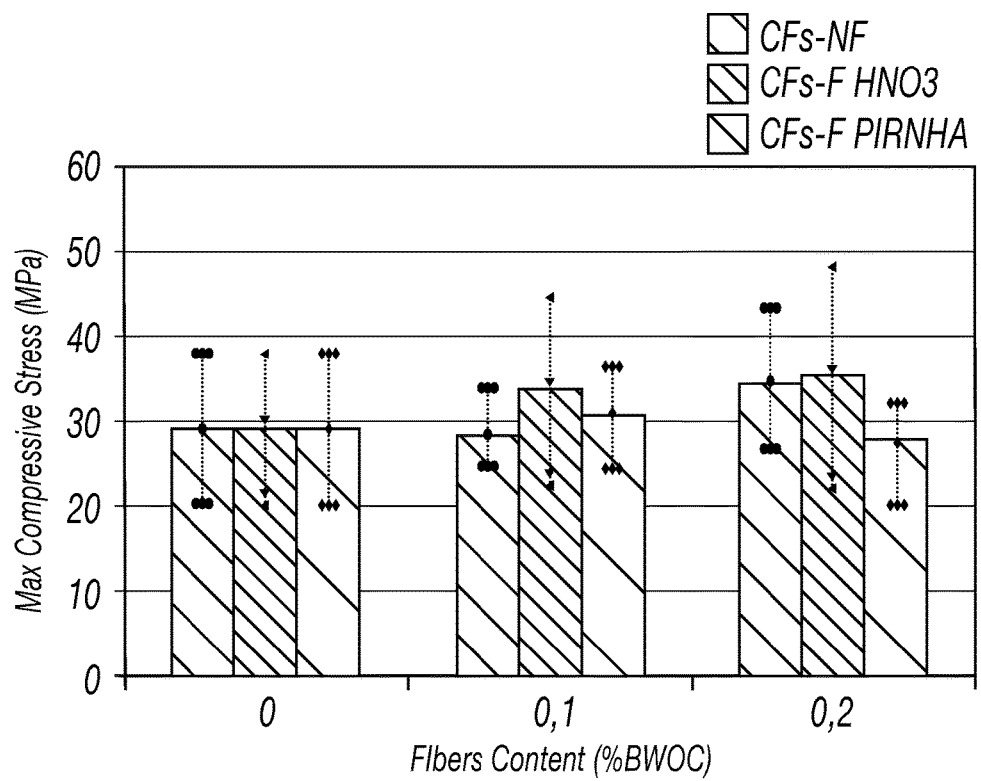
FIG. 14 depicts compressive stress data for cement compositions prepared in accordance with the present disclosure.

In additional testing, the compressive strength of functionalized carbon nanotubes was assayed. With particular respect to FIG. 14, cured cements were prepared containing varying concentrations of functionalized nanotubes by weight of cement. As shown, samples functionalized using nitric acid oxidation exhibited increased compressive strength with respect to the cement control. CFs-F_HNO3 is a sample with fibers functionalized in nitric acid for 1 hour at 70° C., CFs-F_Piranha is a sample with fibers functionalized in piranha solution for 30 minutes at room temperature and CF-NF is a sample with fibers which are not functionalized.

While the disclosure has presented a limited number of embodiments, those skilled in the art, having benefit of this disclosure, will appreciate that other embodiments can be devised which do not depart from the scope of the disclosure as presented herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:
   pumping a cement composition comprising one or more conductive fillers into an annular region of a wellbore created between a casing and a surface of the wellbore wherein the one or more conductive fillers is functionalized carbon nanotubes;
   allowing the cement composition to cure;
   emplacing a tool for measuring at least one electromagnetic property into the wellbore; and
   measuring at least one of the cemented casing and the formation.

2. The method of claim 1, wherein the one or more conductive fillers is a mixture of the functionalized carbon nanotubes and carbon fibers.

3. The method of claim 1, wherein the functionalized carbon nanotubes contain one or more carboxylate functional groups.

4. The method of claim 1, wherein the cement composition further comprises a surfactant.

5. The method of claim 1, wherein the cement composition comprises a high temperature setting cement.

6. The method of claim 1, wherein the one or more conductive fillers is present at a concentration that ranges from 0.001% by weight of cement to 10% by weight of cement.

7. The method of claim 1, wherein measuring at least one of the cemented casing and the formation comprises measuring the resistivity of the formation through the emplaced cement composition and casing and into the surrounding formation.

8. The method of claim 1, wherein the set cement composition functions as a piezoresitive sensor, and wherein measuring at least one of the cemented casing and the formation comprises measuring mechanical stress of the cemented casing.

9. A method comprising:
   preparing a cement composition comprising one or more conductive fillers;
   allowing the cement composition to set;
   measuring at least one electromagnetic property of the set cement; and wherein measuring at least one of the resistivity or conductivity of the set cement comprises measuring a mechanical stress on the cement.

10. The method of claim 9, wherein the cement composition further comprises a surfactant.

11. The method of claim 9, wherein the cement composition comprises one or more cement additives selected from a group consisting of magnesium oxide and calcium oxide.

12. A cement composition comprising:
   a cement;
   one or more conductive fillers wherein the one or more conductive fillers comprises one or more functionalized conductive fillers; and
   a surfactant, wherein the resistivity of the cement composition is less than 10 $\Omega$*m.

13. The composition of claim 12, wherein the one or more conductive fillers is one or more selected from a group consisting of: single wall nanotubes, multi-walled nanotubes, graphene, conductive carbon, and carbon fibers.

14. The composition of claim 12, wherein the surfactant is one or more selected from a group consisting of: sodium dodecyl sulfate, sodium dodecyl benzene sulfonate, polynaphthalene sulfonate, and polyethylene oxide/polyphenylene oxide copolymer.

15. The composition of claim 12, wherein the composition further comprises one or more cement additives selected from a group consisting of magnesium oxide and calcium oxide.

16. The composition of claim 12, wherein the one or more conductive fillers is a mixture of the one or more functionalized carbon nanotubes and carbon fibers.

17. The composition of claim 12, wherein the resistivity of the cement composition is less than 1 $\Omega$*m.

* * * * *